US008856825B1

(12) United States Patent
Mick, Jr. et al.

(10) Patent No.: US 8,856,825 B1
(45) Date of Patent: Oct. 7, 2014

(54) SERVER SIDE ADAPTIVE BIT RATE REPORTING

(71) Applicant: This Technology, Inc., Denver, CO (US)

(72) Inventors: John Raymond Mick, Jr., Sunnyvale, CA (US); Jeffrey Sherwin, Scarsdale, NY (US); Bryan David Santangelo, Tulsa, OK (US)

(73) Assignee: This Technology, Inc., Denver, CO (US)

( * ) Notice: Subject to any disclaimer, the term of this patent is extended or adjusted under 35 U.S.C. 154(b) by 0 days.

(21) Appl. No.: 13/875,364

(22) Filed: May 2, 2013

(51) Int. Cl.
*H04N 7/10* (2006.01)
*H04N 21/81* (2011.01)

(52) U.S. Cl.
CPC ............................ *H04N 21/812* (2013.01)
USPC .............................................. 725/32

(58) Field of Classification Search
CPC .................... H04N 21/4331; H04N 21/812
USPC .................................................. 725/32
See application file for complete search history.

(56) References Cited

U.S. PATENT DOCUMENTS

| 5,872,588 | A * | 2/1999 | Aras et al. ................. 725/14 |
| 2009/0150930 | A1 * | 6/2009 | Sherwin et al. ............. 725/35 |
| 2010/0280876 | A1 * | 11/2010 | Bowra ....................... 705/10 |
| 2012/0272262 | A1 * | 10/2012 | Alexander et al. .......... 725/32 |

OTHER PUBLICATIONS

Society of Cable Telecommunications Engineers, Engineering Committee, Digital Video Subcommittee, American National Standard, ANSI/SCTE 130-3 2010, 283 pages.
Society of Cable Telecommunications Engineers, Engineering Committee, Digital Video Subcommittee, SCTE 130-3 2010, 289 pages.
Society of Cable Telecommunications Engineers, Engineering Committee, Digital Video Subcommittee, SCTE 130-5 2010, 50 pages.
Society of Cable Telecommunications Engineers, Engineering Committee, Digital Video Subcommittee, ANSI/SCTE SCTE 130-1 2008, 16 pages.

* cited by examiner

*Primary Examiner* — Nathan Flynn
*Assistant Examiner* — Alfonso Castro
(74) *Attorney, Agent, or Firm* — Lowenstein Sandler LLP

(57) ABSTRACT

A method and system for reporting a percentage of an advertisement playable by a smart appliance is disclosed. A server receives metadata associated with an advertisement in a transport signal stream from an encoder. The server determines a length of the advertisement and a frame rate of the transport signal stream based on the received metadata. The server divides the advertisement into at least one segment based on the length and the frame rate. The server instructs the encoder to insert at least one marker into at least one frame of the advertisement corresponding to the at least one segment of the transport signal stream to create at least one marked segment.

16 Claims, 10 Drawing Sheets

SERVER SIDE ADAPTIVE BIT RATE REPORTING

FIELD OF THE INVENTION

The present invention relates generally to service provider video networks, and more particularly to a method and system for accurately reporting a percentage of an advertisement playable or that has been played by a smart appliance.

BACKGROUND OF THE INVENTION

Traditionally, programming of broadcast and cable television and radio, including content (i.e., the video or audio program) and (the placement of) ads in a video or audio signal stream, has followed a linear model. Programming may be linear in the sense that a program begins and is streamed and in progress when a user chooses to view entertainment content. FIG. 1 illustrates a conventional linear or video-on-demand (VOD) model for advertisement placement. Entertainment content 2, when processed as a digital data stream over a cable network, may be divided into a number of time intervals. The time intervals 4 include time reserved for a viewed program (content), such as "Golden Girls." The intervals 6, 8, 9 represent sections of time reserved for advertisements or "avails." These "avails" may be viewed as advertisement placement opportunities. As used herein, a "placement opportunity" was traditional called an avail and is sometimes referred to as a slot (spots into slots). A placement opportunity (PO) is a construct that represents an opportunity to insert an advertisement or entertainment content, and defines the rules for that opportunity, such as its duration, interactivity, ownership, and technical constraints.

As used herein, the term "binding" refers to an identification of signals and content within a placement opportunity (PO). PO's are frequently created for broad amounts of content that are not yet published (i.e., any show on TNT network in the evening). When the show airs and a signal is detected, the signal is bound to the relevant PO's for that show.

As used herein, the term "impression" refers to a showing of an advertisement to a single viewer. For example, if a 30 second spot is placed in 50,000 video-on-demand (VOD) streams and it is known that 30,000 of the streams actually played the ad, then 30,000 impressions of that advertisement have been generated.

As used herein, a "status notification" may be, but is not limited to, an HTTP call from a VOD server with a unique ID that was created when a decision was delivered.

As used herein, the term "break" refers to one or more spaces in a stream between entertainment content. For example, a group of 4 consecutive 30 second spots between 2 segments of "Two and a Half Men" may be considered as a single break. One or more advertisements may fill a break. As used herein, the term advertisement may refer to a one advertisement or a plurality of advertisements collectively inserted or insertable into an individual break.

As used herein, an estimated starting location of a break in a signal stream is referred to as a signal point. In the context of advertisement placement, these signal points may be referred to as advertisement signal points.

In non-linear systems, such as Video-on-Demand (VOD), the intervals 6, 8, 9 may take on new meanings. The interval 6 is called a pre-roll, i.e., the space in a video that occurs immediately after a user clicks to start a VOD video. The interval 9 is known as a post-roll, i.e., the space after all of the VOD video segments have finished playing. The intervals 8 may be mid-rolls, i.e., mini-breaks in the middle of a VOD video, or may be interstitials, i.e., pod-like locations between consecutive VOD video segments. VOD advertisement placement opportunities may appear based on space, time, content, and user context and may be highly non-linear (i.e., the user chooses to initiate the playing of content and in response, the content starts). All of the intervals 6, 8, 9 in such play lists are ripe for the insertion of advertisements, i.e., advertisement placement opportunities.

FIG. 2 depicts a configuration of a conventional Internet-based cable television infrastructure 200 for performing advertising placement decisions in signal streams. On TV, the advertising network was formerly the national network, the cable network, or the cable operator. However, unlike the Internet, where browsers access/display content and then are separately "referred" to a shared advertisement network, the Internet-based cable television infrastructure 200 selects and assembles both the advertisement and the content together and delivers the combined result to customers' "smart appliances" 202a-202n (e.g., Internet ready televisions, radios, smartphones, tablets, PCs, etc.).

Recently, smart appliances 202a-202n, such as Internet-ready televisions, have become capable of receiving content from Internet streaming services, such as Netflix movies, Pandora streaming radio, etc., over WiFi or direct Ethernet connections. When a user clicks on an icon for an "app" that appears on the television set corresponding to one of these services, the content is streamed to the smart appliance 202a-202n from a content delivery network (CDN) 204 directly to the application running in the smart appliance 202a-202n without the need for a set top box.

A set top box may be configured to decode an analog representation of two states of a digital signal, as is known in the art, that is continuously streamed and pushed to the set top box through a broadcast facility over a coaxial or fiber optic cable and the set top box tunes to that channel and displays the content. When a user watches Internet-delivered program content, a browser within the smart appliance 202a-202n fetching video in predetermined time chunks—generally two, sometimes three, sometimes ten second chunks. The fetched chunks of video are seamlessly stitched together dynamically in the application software of the smart appliance 202a-202n and then displayed so as to appear as a smooth video on the smart appliance 202a-202n.

A Multiple System/Service Operator (MSO—a cable TV organization that owns more than one cable system and may prove broadband Internet service) may wish to rebroadcast video streams on smart appliances. Unfortunately, every connected device, including smart appliances, needs to obtain video in the format that it can consume. Apple, Microsoft, Adobe, etc., have very specific and incompatible formats. To overcome this problem, each of these companies has constructed facilities called content delivery networks (CDN) 204 where a "set top box" for each channel is configured to receive broadcasts from satellites.

A signal stream received by a "set top box" from upstream devices 206 is fed to an encoder 208 to transform the signal stream to a transport signal stream of one or more bit rates and/or formats and a packager 210 to fragment the transport signal stream into the predetermined (e.g., 2 second) segments of data. The encoder 208 may convert the signal stream to one or more of a plurality of formats (e.g., H264, MPEG2, MPEG4, etc.) and resolutions (e.g., standard definition at 640p, or high definition at, for example 720p, 1080i, 1080p, etc.). A distinct transport signal stream may be provided to the packager 210 in each of the plurality of formats and resolutions. The packager 210 may divide the transport signal streams into segments representing intervals of time or "chunks" of video, audio, etc. (e.g., between 2 and about 10 second intervals) according to a standard format associated with a specific vendor (e.g., Microsoft, Apple, Adobe, etc.). These segments are then stored at the CDN 204 on server farms located physically close to where the content is to be delivered.

To identify a particular channel data stream or "session", including times when a program has ended and before the next program begins, i.e., a placement opportunity, a cue-tone is inserted in the channel data stream a predetermined time before the next program begins. The cue-tone may be an instance of an SCTE-35 packet.

An observer 210, which may be the transcoder 208, informs placement opportunity information service (POIS) 211 of the arrival of the cue tone for subsequent placement of one or more advertisements into the channel data stream by an advertisement service (ADS) 214. If the ADS 214 is known to the POIS 211, then the POIS 211 notifies the ADS 214 of the cue tone notification. The advertisement service 214, in turn, is waiting for the subsequent arrival of requests from a CDN 204 to place advertisements into breaks (i.e. one or more of the segments) in the channel data stream (session).

MSOs, national networks, and local networks prefer to know whether an advertisement has been played and watched by a subscriber. More particularly, advertisers may be compensated by the MSOs and networks based on the proportion of an advertisement that has been watched by a subscriber. Compensation has been traditionally based on the number of quartiles of an advertisement that has been watched: 0%, 25%, 50%, 75%, to 100%. Equipment manufacturers have traditionally provided this feature on one of two ways: by building intelligence into each smart appliance (e.g., 202a), or by building intelligence into a reporting network, e.g., a cloud computing network, while not altering exiting smart appliances 202a-202n. Both techniques may employ what is known as a manifest file. As used herein, a manifest file, a manifest, or a session manifest, refers to a listing or index of what is contained in each of the segments of a session maintained by the CDN 204. More particularly, the session manifest may include a list of URLs which point to each of the segments and notes the type of segment: content or advertisement.

When intelligence is built into a smart appliance (e.g., 202a), the smart appliance 202a may (1) maintain a copy of the session manifest, (2) perform the function of splicing an advertisement into a placement opportunity that was formerly performed by the ADS 214, (3) mark the session manifest for each segment played, and (4) report a proportion of a session (e.g., the number of segments) played to the MSO or network.

MSOs and networks, however, may prefer to employ any manufacturer's smart appliance (e.g., 202a). Both the MSOs and the networks have been moving toward providing their own viewing experience by providing only applications "apps" to a subscriber's equipment without altering the equipment.

When intelligence is built into the network, corresponding reporting networks may need to maintain a separate manifest for each viewer session. Still further, the reporting network needs to test and operate their reporting hardware and software with a multiplicity of transport signal stream encoding formats and resolutions, vendor packaging standards, and vendor-specific smart appliance software and hardware. Maintaining a manifest for each viewer, according to each encoding format and resolution, packaging format, and vendor-specific smart appliance software and hardware may require processing power on the order of hundreds of thousands of threads of execution, translating to a need to maintain and operate a large number of multi-threaded computers. Moreover, even if a thread indicates that an advertisement was downloaded, it does not mean that the advertisement was played. The advertisement may be buffered and flushed before viewing.

Ideally, MSOs and networks prefer to have flexibility in working with players and reporting networks of any type.

Accordingly, what would be desirable, but has not yet been provided, is a method and system for accurately reporting a percentage of each advertisement viewed by a subscriber during a viewing session without significantly modifying existing smart appliances or reporting networks.

SUMMARY OF THE INVENTION

The above-described problems are addressed and a technical solution is achieved in the art by providing a method and system for reporting a percentage of an advertisement playable by a smart appliance. A server receives metadata associated with an advertisement in a transport signal stream from an encoder. The server determines a length of the advertisement and a frame rate of the transport signal stream based on the received metadata. The server divides the advertisement into at least one segment based on the length and the frame rate. The server instructs the encoder to insert at least one marker into at least one frame of the advertisement corresponding to the at least one segment of the transport signal stream to create at least one marked segment.

In another example, the length of the advertisement and a frame rate of the transport signal stream may be determined based on an analysis of the in-band transport signal stream itself rather than from out-of-band metadata associated with the transport signal stream.

In an example, at least one marked segment may be indicative of a percentage of the advertisement playable by a smart appliance. The length of the advertisement may be representative of a difference in time between a last frame of the advertisement and a first frame of the advertisement. A length of the at least one segment may be based on the frame rate. The number of segments may be based on quartiles of percentage of an advertisement playable by the smart appliance.

In an embodiment, the server may instruct the encoder to insert the at least one marker (e.g., UUID1) on a per frame, per segment, per sub-segment, or per plurality of segments basis. The server may instruct the encoder to insert a different value for the at least one marker into each segment of the at least one segment. A specific segment may be proportional to a percentage of the advertisement playable by the smart appliance.

In an embodiment, when the frame rate changes during transmission of the advertisement, the server may instruct the encoder to insert at least one different marker into at least one frame of the advertisement corresponding to the at least one segment. The server may instruct the encoder to insert the at least one marker into at least one of a first frame of a percentile, a last frame of a percentile, multiple but not all frame of a percentile, or throughout a percentile.

In one embodiment, the server may group a plurality of markers associated with a specific percentile but of different frame rates for each transport stream together for identifying a single percentile played.

In one example, the marker may be an ID3 tag. In an example, the ID3 tag may comprise a unique identifier indicative of a percentage of an advertisement playable by the smart appliance. In an example, the unique identifier may be a universal unique identifier. The server may instruct the encoder to insert the ID3 tag into a data track or fundamental track of the transport signal stream. In another example, the marker may be encoded into XML metadata in a sparse track of the transport signal stream.

In an embodiment, the at least one ID3 tag (marker) assigned to a last segment may be operable to disable fast forwarding in the smart appliance. The at least one ID3 tag (marker) assigned to a first segment may be operable to enable fast forwarding in the smart appliance.

In an embodiment, the server receives data from a smart appliance. The server detects a marker in the data corresponding to a segment of an advertisement of a session played by the smart appliance. The server maps the marker to a percentage played of the advertisement in the session by the smart appliance. The server reports the percentage played of the advertisement in the session by the smart appliance to at least one tracking element.

In one embodiment, the received data may be in the form of a universal resource locator (URL). The URL may comprise at least one of a universal unique identifier indicative of the percentage of the advertisement break played, a device identifier or MAC identifier indicative of a specific session, and a time stamp corresponding to a synchronized broadcast time.

In an embodiment, the detected marker may differ on a per frame, per segment, per sub-segment, or per plurality of segments basis. The detected marker may differ on a per percentile basis of the advertisement break played by the smart appliance. The detected marker may differ on a per frame rate or session resolution of the advertisement played by the smart appliance. The marker may be detected for one of a first frame of a percentile, a last frame of a percentile, multiple but not all frame of a percentile, or throughout a percentile. The detected marker may be indicative of a frame rate or resolution of a segment of the session.

In an embodiment, the marker may comprise an ID3 tag. The ID3 tag may comprise a unique identifier indicative of the percentage of an advertisement playable by a smart appliance. The unique identifier may be a universal unique identifier (UUID).

In an embodiment, when the detected marker is indicative of a frame rate or resolution of a segment of the session, the server may map the detected marker to a same percentage played but of a different frame rate or session resolution. The server may group a plurality of markers associated with a specific percentile but of different frame rates corresponding to the session together for identifying a single percentile played.

The tracking element may be associated with a local or national programmer or network, an MSO, a local or national advertiser, a third party verification system, or one or more advertisement decision services.

In an embodiment, the server may keep track of the data (e.g., the percentage played of each session) in a database for later retrieval in order to permit an owner of the server to charge an organization associated with the tracking element a fee based on the percentage of a session played. In an embodiment, the adaptive bit rate viewer may directly keep track of tracking fees to be charged to an organization associated with the tracking element based on the percentage of an advertisement played.

In one embodiment, the server may transmit code to the smart appliance to detect the marker and to provide the marker to the server in response to the smart appliance detecting the marker. To accomplish this, the server may instruct an advertisement decision service or content delivery network to insert the code into at least a first segment of a session.

In another example, the MSO may distribute the code document to the manufacturers of the smart appliances to permit a manufacturer to incorporate the code into the overall executable code of the smart appliances. Code for enabling or disabling fast forwarding may be included in the code document.

BRIEF DESCRIPTION OF THE DRAWINGS

The present invention will be more readily understood from the detailed description of exemplary embodiments presented below considered in conjunction with the attached drawings, of which.

Figure 1:
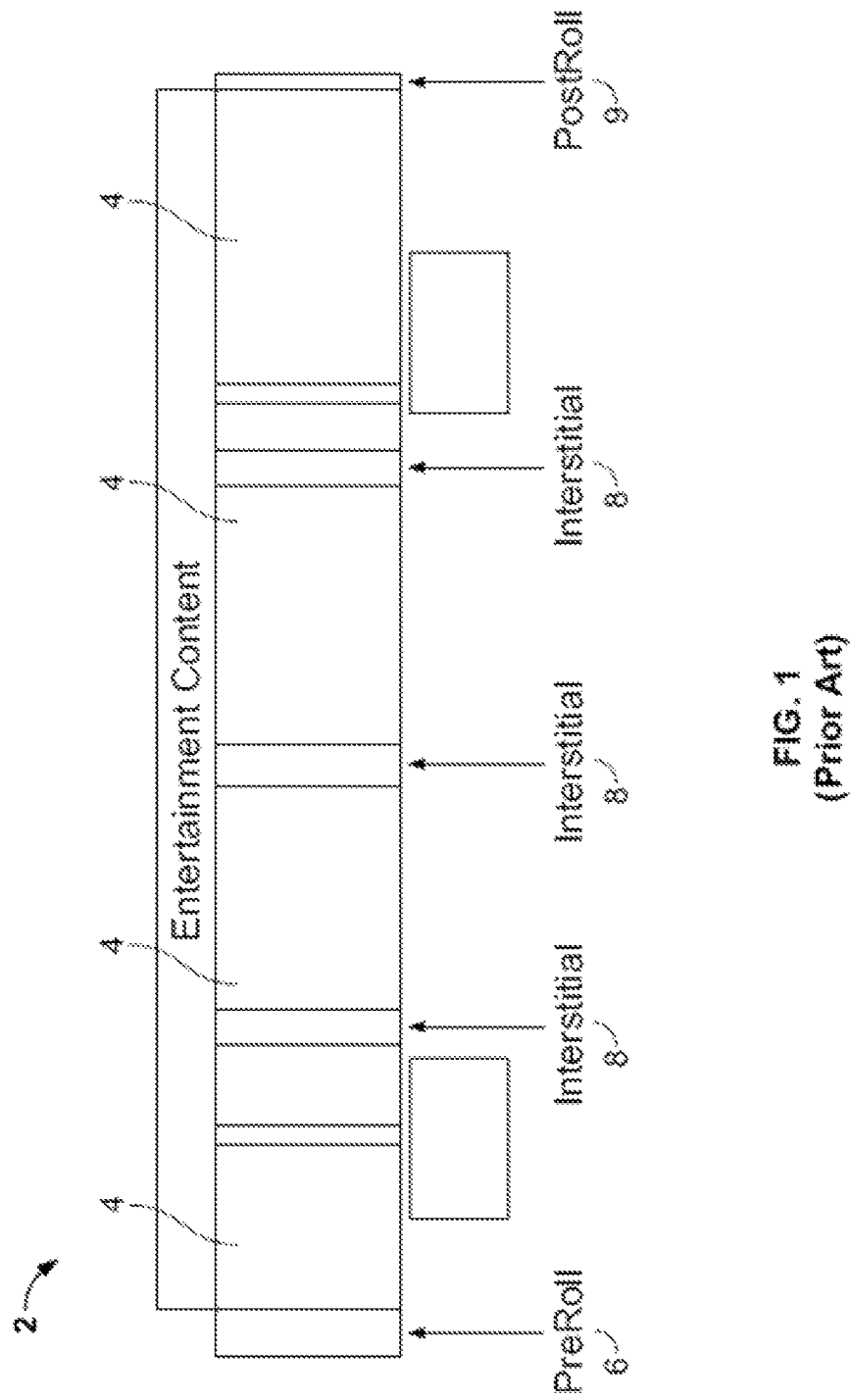
FIG. 1 illustrates a conventional linear or video-on-demand model for advertisement placement.
Figure 2:
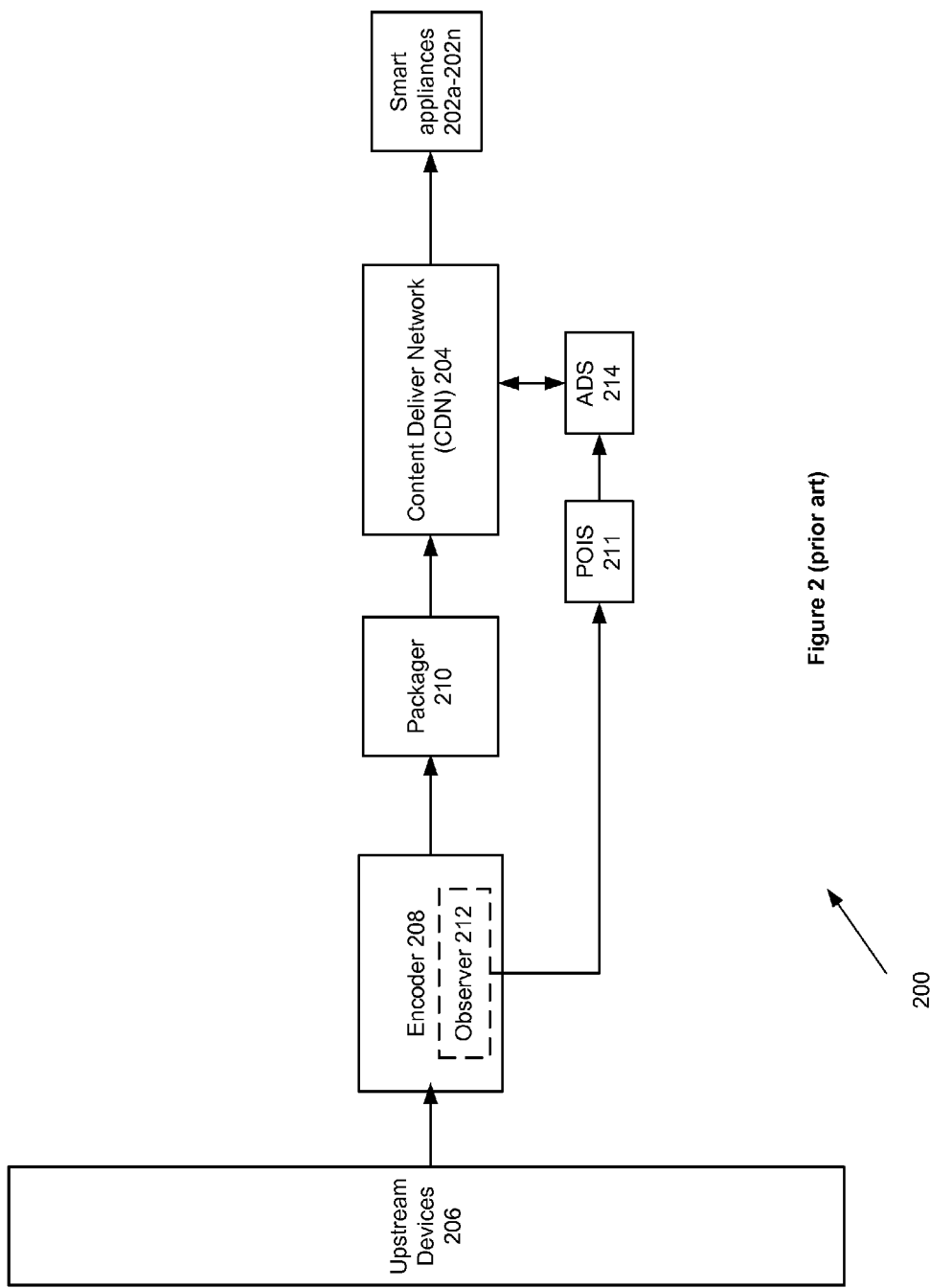
FIG. 2 depicts a configuration of a conventional Internet-based cable television infrastructure for performing advertising placement decisions in signal streams.

It is to be understood that the attached drawings are for purposes of illustrating the concepts of the invention and may not be to scale.

DETAILED DESCRIPTION OF THE INVENTION

Certain embodiments of the present disclosure are compatible with and make use of elements defined according to the SCTE-130 standard. The SCTE-130 standard provides a standardized and extensible message based interface defining a minimal set of cooperating logical services necessary to communicate placement opportunities, placement decisions, and placement related event data necessary for accountability measurements. SCTE-130 defines an extensible framework of interfaces among a set of advertising system logical services. The SCTE-130 standard encompasses: a minimal set of cooperative logical services needed to implement advanced addressable advertising systems; the core data types and extensible message framework forming a vocabulary needed to communicate among the defined logical services; the interfaces among these logical services using the core data types and messages; and, mechanisms for extensibility that allow innovation while preserving backward compatibility with already deployed systems—thereby reducing the complexity for incorporating new features within the standard.

The normative parts of the SCTE-130 standard define mechanisms for integrating systems implementing features such as VOD-based advertising, linear-based advertising, enhanced advertising capabilities such as advertisement rotation groups (rotation groups refer to placement opportunities that run in rotation so that the same advertisement is not viewed again immediately), subscriber-based addressing for advertising or content tailoring, extension points for more advanced advertising or addressing features, logical services that are implemented as one or more physical systems created by the same vendor, deployment of a logical service that may simultaneously include systems from one or more vendors, and an implementation that may incorporate one or more of the defined logical services and interfaces The SCTE-130 standard defines a set of logical services comprising an advanced advertising system. Each logical service may itself be a complex system. In an embodiment, one or more of the following logical services may be used by or interact with certain embodiments of the present invention.

An Advertisement Management Service (ADM) defines messages in support of advertisement insertion activities. The primary consumer of these messages is an Advertisement Decision Service (ADS). The message interfaces exposed by an ADM permit both pre-configured advertisement decisions as well as real-time fulfillment models. An ADM implementation may incorporate some simple advertisement selection rules (e.g., advertisement rotations) but more complex advertisement decisions are the responsibility of an ADS.

An Advertisement Decision Service (ADS) determines how advertising content is combined with non-advertising (i.e., entertainment) content assets. The decisions made by an ADS may be straightforward (i.e., specific advertisement content placed at a specific time in a specific asset) or arbitrarily complex (based on subscriber data, advertising zone, etc.).

A Content Information Service (CIS) manages metadata describing assets (both advertising assets and non-advertising assets) available to the other SCTE-130 logical services. The CIS provides query and notification interfaces to the other logical services. The query service is available on an ad-hoc basis and may be called by any other logical service at any time without any prior registration. Queries specify values or patterns to be sought in the query message metadata and the specified matching information (or an error indication) is returned in a response message.

The Content Information Service (CIS) is a storage and distribution engine. It stores metadata about entertainment and advertising assets; provides notifications to registered clients when metadata is modified; registers, receives and processes notifications from other CIS services; and supports real-time metadata queries. The CIS permits an Advertising Manager (ADM) and/or Advertisement Decision Service (ADS) to retrieve and utilize content metadata in their advanced advertising decision processing.

A Placement Opportunity Information Service (POIS) may hold, maintain, and retain descriptions of placement opportunities. The POIS may also contain attributes and constraints for each placement opportunity, platform compliance, rights, and policies of the content in which the placement opportunity exists. These placement opportunities are content specific, therefore attributes and constraints may vary by network, geographic region, or other content distribution dimension.

The POIS is a Placement Opportunity (PO) storage and inventory execution engine. It stores PO metadata and statistics; provides notifications to registered clients when PO metadata is modified; registers, receives and processes notifications from other POIS services; and supports real-time PO metadata queries. Through the POIS appliance, an Advertising Manager (ADM) and/or Advertisement Decision Service (ADS) can retrieve and utilize placement opportunity metadata in their advanced advertising decision making.

The Subscriber Information Service (SIS) manages per-subscriber information relevant to advertisement placement decisions. The SIS provides a mapping between subscriber or client identifiers, such as a MAC address, serial number, etc., and subscriber or audience attributes, e.g., age, sex, location of a subscriber.

The term "computer" or "computer platform" is intended to include any data processing device, such as a desktop computer, a laptop computer, a tablet computer, a mainframe computer, a server, a handheld device, a digital signal processor (DSP), an embedded processor (an example of which is described in connection with FIG. 10), or any other device able to process data. The computer/computer platform is configured to include one or more microprocessors communicatively connected to one or more non-transitory computer-readable media and one or more networks. The term "communicatively connected" is intended to include any type of connection, whether wired or wireless, in which data may be communicated. The term "communicatively connected" is intended to include, but not limited to, a connection between devices and/or programs within a single computer or between devices and/or separate computers over a network. The term "network" is intended to include, but not limited to, OTA (over-the-air transmission, ATSC, DVB-T), packet-switched networks (TCP/IP, e.g., the Internet), satellite (microwave, MPEG transport stream or IP), direct broadcast satellite, analog cable transmission systems (RF), and digital video transmission systems (ATSC, HD-SDI, HDMI, DVI, VGA), etc.

Figure 3:
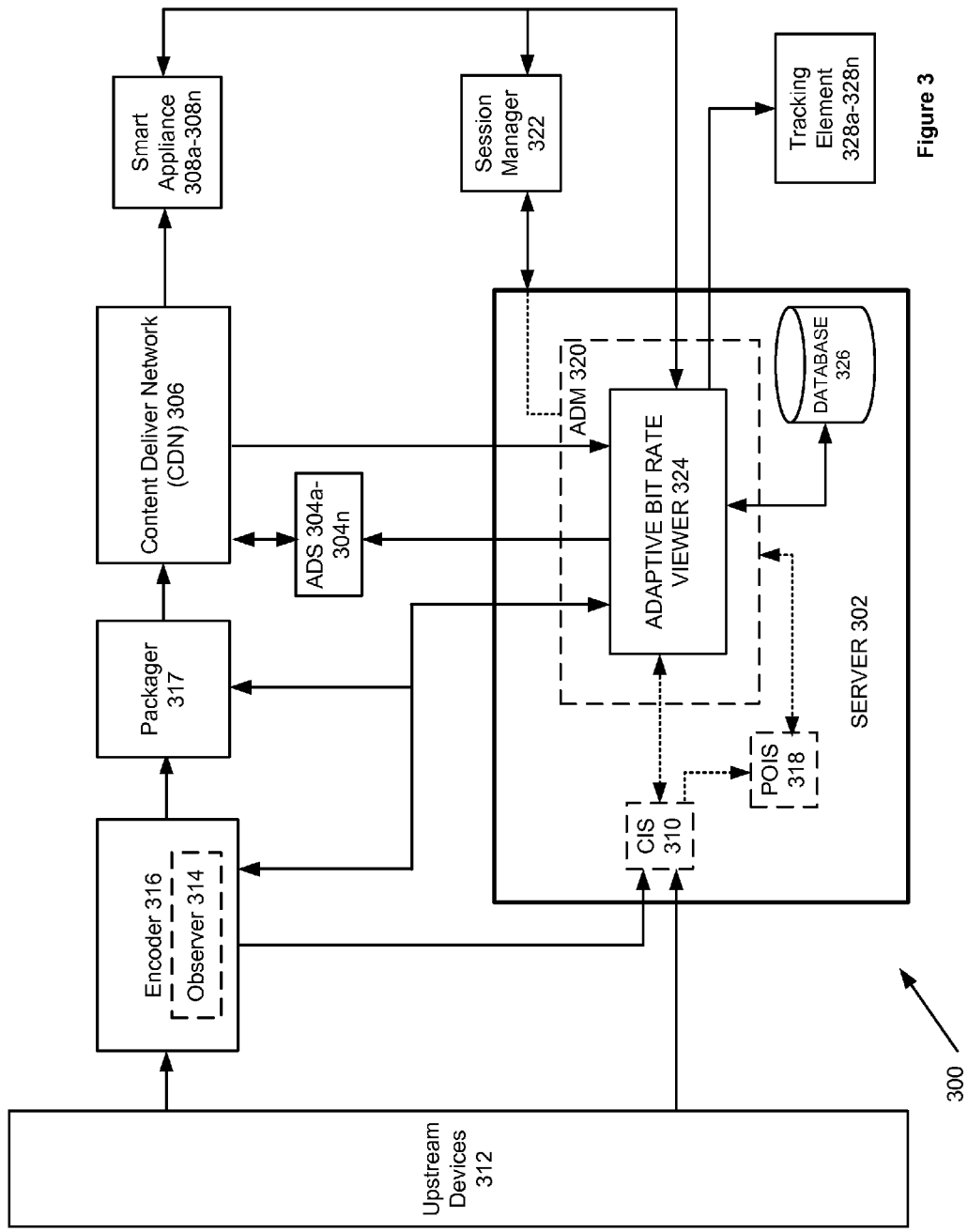
FIG. 3 depicts a configuration of a system for reporting a percentage of an advertisement that is playable or that has been played by a smart appliance.

FIG. 3 depicts a configuration of a system 300 for reporting a percentage of an advertisement playable by a smart appliance. The system 300 may be executed on a server 302, interconnected by one or more networks (not shown) and communicatively connected to one or more ADSs 304a-304n. The ADSs 304a-304n are configured to place advertisements into advertisement breaks in subscriber data streams at the request of a CDN 306 for delivery to one or more smart appliances 308a-308n.

The server 302 may be associated with or implement a CIS 310 for receiving one or more source signal streams (channels) originating from upstream devices 312 and corresponding cue-tones (i.e., instances of SCTE-35 packets) from an observer 314, which may be incorporated within an encoder 316. The CIS 310 is also configured to identify metadata from the one or more source signal streams received from the encoder 316 and to deliver the identified metadata to the server 302. The received metadata may identify each of a plurality of formats (e.g., H264, MPEG2, MPEG4, etc.) and resolutions (e.g., standard definition at 640p, or high definition at, for example 720p, 1080i, 1080p, etc., that includes a frame rate of the transport signal stream) for each of the one or more transport signal streams output by the encoder 316 and corresponding to a respective source signal stream (channel). As described above, the encoder 316 is configured to feed each of the transport signal streams to a packager 317. The packager 317 is configured to further format the one or more transport signal streams and divide the streams into segments representing intervals of time or "chunks" of IP video, audio, etc., (e.g., between 2 and about 10 second intervals) according to a standard format associated with a specific vendor (e.g., Microsoft, Apple, Adobe, etc.). The packager 317 is configured to deliver IP video, audio, etc., in predetermined "chunks" to the CDN 306 as described above. The server 302 is also configured to extract metadata from the packager 317 that a length in terms of time of a segment or chunk size.

The server 302 is configured to pre-allocate a corresponding number of unconfirmed placement opportunities (POs) without signals and to bind the source signal stream to a plurality of premade, but unconfirmed placement opportunities. Part of the identified metadata includes a channel identifier associated with a corresponding source signal stream. The CIS 310 is configured to return a globally unique value, a UUID, referred to as a signal identifier or signal ID that uniquely identifies a placement opportunity as a confirmed placement and its starting location within the end-to-end operational system 300. The CIS 310 is further configured to insert the signal ID and the channel identifier into the metadata of the source signal stream using the appropriate in-band carriage format.

In one embodiment, a POIS 318 may be implemented by the server 302. The POIS 318 is configured to "confirm" unconfirmed placement opportunities by identifying temporal starting and ending locations (and thus a beginning and end point in terms of time) of the unconfirmed placement opportunities (i.e., including advertisement signal point(s)) relative to both the content stream and a wall clock.

In one embodiment, the POIS 318 may be configured to initiate a workflow in an instance of an SCTE 130 Advertisement Management Service 320, or ADM 320, associated with the server 302 to identify a list representative of a number of transport streams (e.g., a number of sessions) having the channel identifier. To identify the list, the ADM 320 places a call each to an external session manager 322. The ADM 320 transmits the channel identifier to the session manager 322, which provides the ADM 320 with a list of client identities indicative of a number of recipients currently viewing a channel corresponding to the channel identifier. The ADM 320 is also configured to obtain a plurality of advertisements corresponding to the list correlated to the channel identifier from one or more of the ADSs 304a-304n. The ADM 320 receives from the ADSs 304a-304n the plurality of advertisements targeted to the list representative of the plurality of transport streams (sessions).

The ADM 320 uses the unique signal ID plus a set of locally configured or learned targeting criteria to initiate a unique set of advertisement decision requests. The advertisement decision requests evolve into targeted advertisement decision requests to the appropriate decision owners (i.e., the ADSs 304a-304n) and the results are a set of advertisement placement decisions correlating to the placement opportunities generated as a result of signal confirmation.

The encoder 316 is configured to receive instructions from an adaptive bit rate viewer (module) 324 of the server 302 to insert one or more markers into each transport signal stream provided by the encoder 316 associated with a channel identifier based on the received metadata (i.e., the transport signal stream frame rate and resolution) provided by the CIS 310 and the beginning and end point of an advertisement break provided by the POIS 318. The adaptive bit rate viewer 324 is configured to determine a length of the advertisement and a frame rate of the transport signal stream based on the received metadata from the CIS 310 and the POIS 318. The adaptive bit rate viewer 324 is configured to divide the advertisement into at least one segment based on the length and the frame rate. The adaptive bit rate viewer 324 is configured instructs the encoder 316 to insert at least one marker into at least one frame of the advertisement corresponding to the at least one segment of the transport signal stream to create at least one marked segment.

In another example, the length of the advertisement and a frame rate of the transport signal stream may be determined based on an analysis of the in-band transport signal stream itself rather than from out-of-band metadata associated with the transport signal stream.

In one example, the adaptive bit rate viewer 324 may be incorporated within the code of the ADM 320. In another example, the ADM may be incorporated separately as an independent module of the code of the server 302 and may cooperate in conjunction with the ADM 320.

In one example, a marker may be an ID3 tag. An ID3 tag has conventionally referred to a metadata container used in conjunction with the MP3 audio file format. An ID3 tag permits information such as the title, artist, album, track number, and other information about a file to be stored in the file itself. In the present context, an ID3 tag may be adapted to include a unique identifier indicative of a percentage of an advertisement that has been played by a smart appliance (e.g., 308a). In an example, the unique identifier may be a universal unique identifier (UUID).

Figure 4:
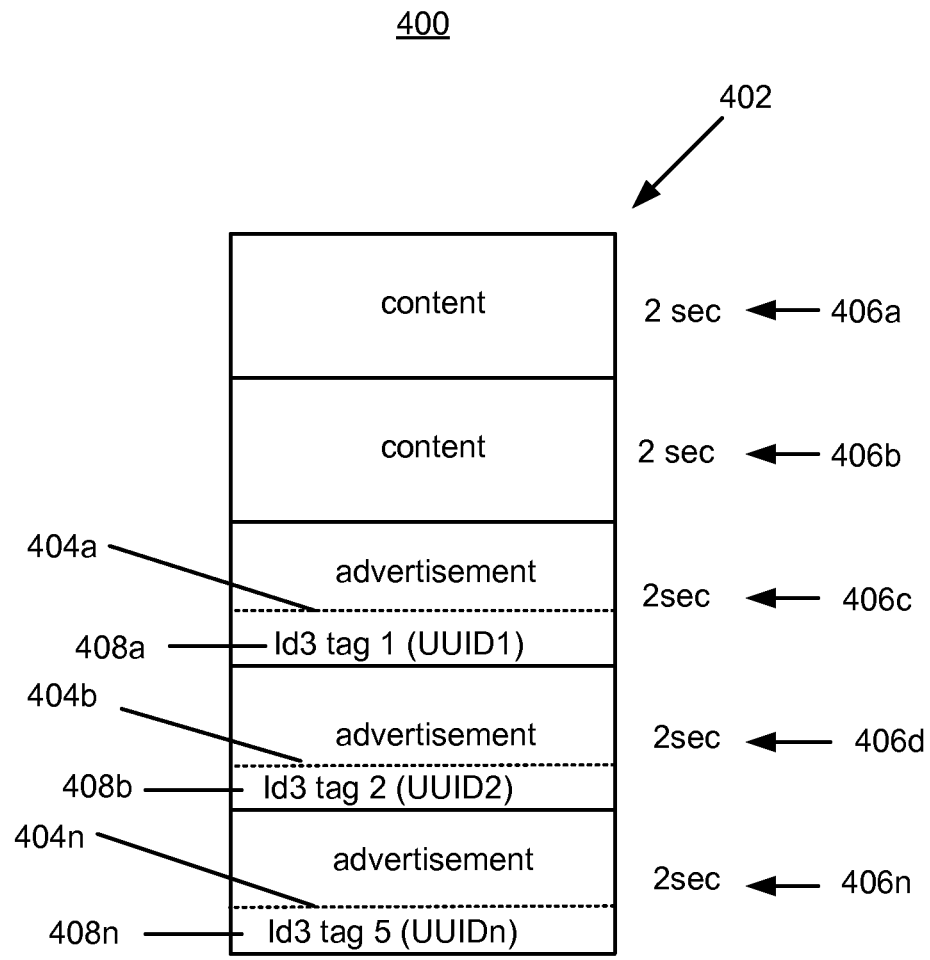
FIG. 4 is a block diagram illustrating the use of an ID3 tag as metadata to be incorporated into corresponding data tracks of a transport signal stream for providing markers for indicating portions of an advertisement played corresponding to each of the segments in a session.

FIG. 4 is a block diagram 400 illustrating the use of an ID3 tag as metadata to be incorporated into corresponding data tracks 404a-404n of a transport signal stream 402 for providing markers for indicating portions of an advertisement played corresponding to each of the segments 406a-406n (e.g., 2 second "chunks") in a session. The transport signal stream 402 may comprise segments (e.g., 406a, 406b) corresponding to content and segments (e.g., 406c-406n) corresponding to an advertisement in the session. Each of the ID3 tags 408a-408n may comprise a unique identifier (e.g., UUID1, UUID2, UUIDn) that indicates a portion of the advertisement played by a smart appliance (e.g., 308a). In an example, to identify a specific quartile played, the adaptive bit rate viewer 324 may assign a different value for the unique identifier (e.g., a different UUID).

Figure 5:
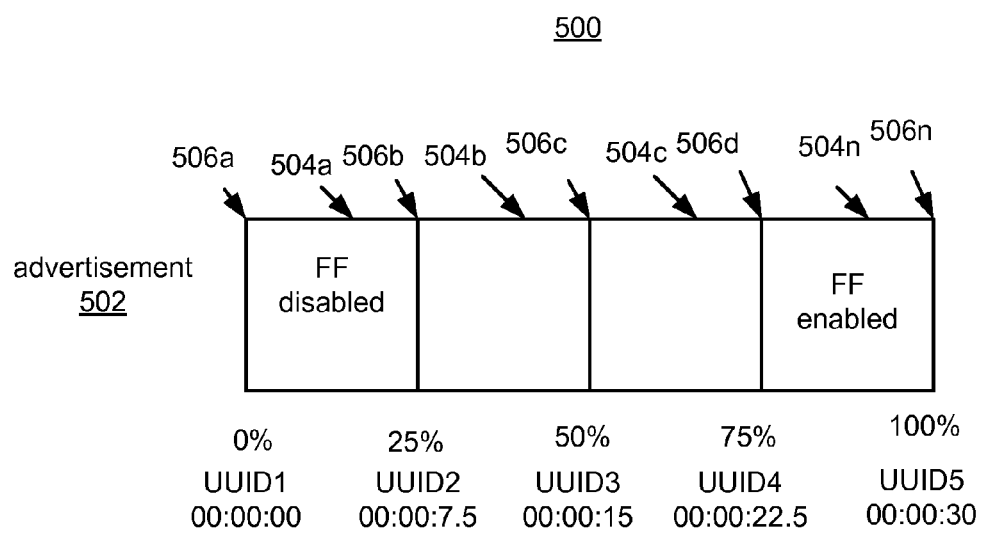
FIG. 5 is a block diagram illustrating a portion of an advertisement divided into a plurality of play time intervals.

FIG. 5 is a block diagram 500 illustrating a portion of an advertisement 502 divided into a plurality of play time intervals 504a-504n. In the example shown, the number of play time intervals 504a-504n corresponds to a number of quartiles 504a-504n of an advertisement to be played by a smart appliance (e.g., 308a) and marked at intervals of 0%, 25%, 50%, 75%, and 100%. In other examples, the play time intervals may be representative of smaller or larger percentage of an advertisement played. UUID1-UUID5 may be associated with each of the quartiles 504a-504n and correspond to time intervals 506a-506n from the beginning to the end of an advertisement to be played (e.g., 00:00:00 seconds to 00:00:30 seconds).

In an example, the unique identifier assigned to a last play time interval (quartile) 504n (e.g., 75%-100% played) may be operable to disable fast forwarding in the smart appliance (e.g., 308a). Conversely, the unique identifier assigned to a first play time interval (quartile) 504a (e.g., 0% played) may be operable to enable fast forwarding in the smart appliance (e.g., 308a).

Figure 6A:
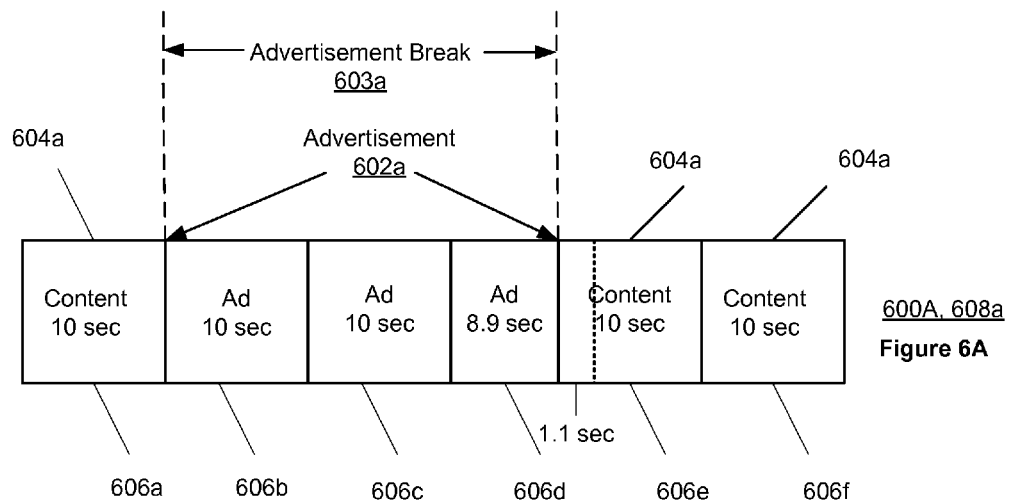
FIGS. 6A-6B are block diagrams illustrating a portion of a transport signal stream representing an advertisement break and surrounding content divided into a plurality of play time intervals or chunks formatted according to different vendors format standards output by the packager.
Figure 6B:
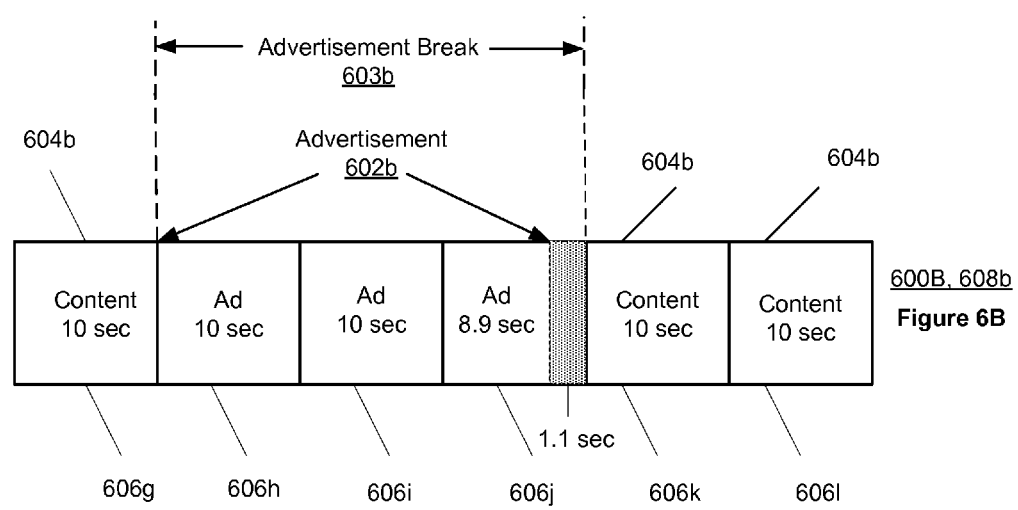

FIGS. 6A-6B are block diagrams 600A-600B illustrating a portion of a transport signal stream representing an advertisement 602a-602b inserted into a corresponding advertisement break 603a-603b and surrounding content 604a-604b divided into a plurality of play time intervals or chunks 606a-606l formatted according to different vendors format standards 608a-608b output by the packager 317. In one example shown in FIG. 6A, the content 604a and the advertisement 602a may be divided by the packager 317 into, for example, ten second chunks. If a beginning of a chunk 606b coincides with a beginning of the advertisement 602a, but the advertisement 602a is only 28.9 second long, then according to one vendor format 608a, the advertisement 602a comprises two, ten second chunks 606b, 606c and an 8.9 second chunk 606d. The end of the chunk 606d coincides with one end of the advertisement break 603a. A chunk of content 606e immediately follows the chunk 606d.

In another example shown in FIG. 6B, according to another vendor format 608b, there are three, ten second chunks 606h, 606i, 606j of advertisement 602b with a portion of the third and final chunk 606j (1.1 second) left blank, and further followed by the next chunk of content 606k. The end of the chunk 606j does not coincide with one end of the advertisement break 603b.

If a smart appliance (e.g., 308a) switches between different resolutions or bit rates during the playing of the advertisement 602a, 602b, then the number of frames per second in a chunk also changes. While it may be possible to identify the beginning 0% played point by identifying the first frame of the advertisement 602a, 602b, and the 100% played point as the last from of the advertisement 602a, 602b, the quartile points for 25%, 50%, and 75% played become difficult to identify.

Figure 7:
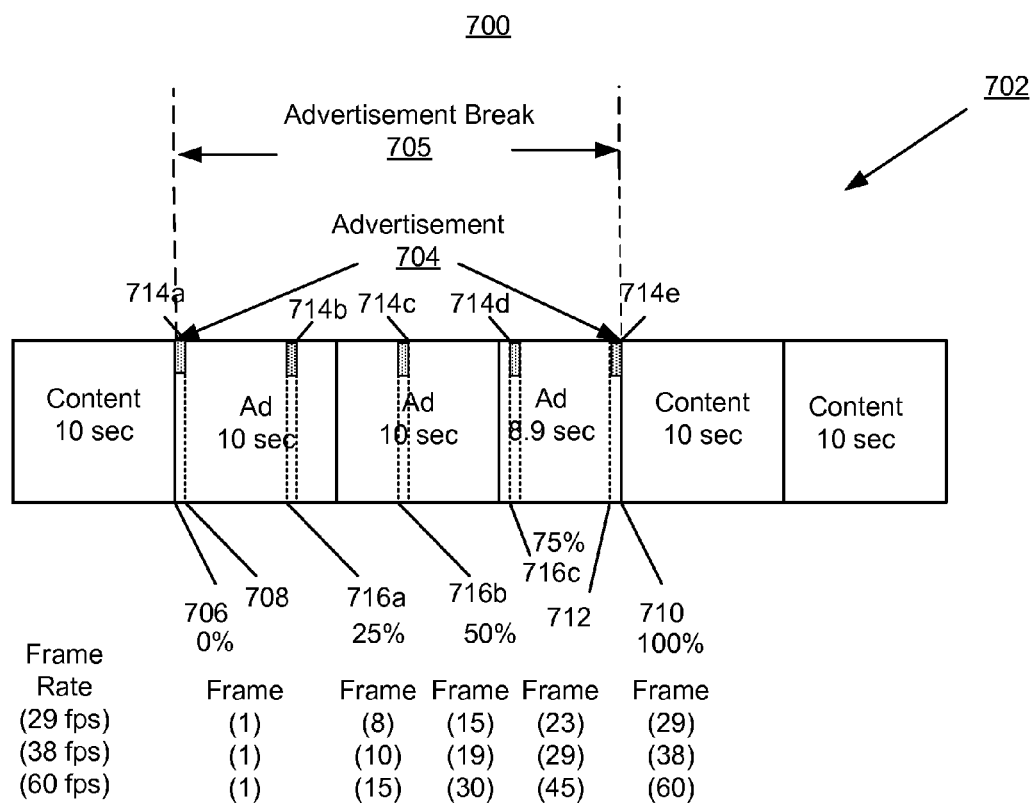
FIG. 7 is a block diagram illustrating one embodiment of a method for inserting unique ID3 tags into a transport signal stream that represents an advertisement of a known length but may have different resolutions or frame rates.

FIG. 7 is a block diagram illustrating one embodiment of a method 700 for inserting unique ID3 tags into a transport signal stream 702 that represents an advertisement 704 of a known length (e.g., 28.9 seconds) placed within an advertisement break 705 but may have different resolutions (e.g., SD, 720p, 1080p) or frame rates (e.g., 29 fps, 38 fps, 60 fps, respectively). The advertisement 704 within the advertisement break 705 of the transport signal stream 702 begins at a time 706 (i.e., located at a first frame 708 representing 0% played) and ends at a time 710 (i.e., located at a last frame 712, representing 100% played). The adaptive bit rate viewer 324 is configured to receive an indication of the bit rate of the transport signal stream 702 from the CIS 310 and an identification of the first frame 708 and the last frame 712 of the advertisement 704 from the POIS 318. The adaptive bit rate viewer is configured to instruct the encoder 316 to insert an ID3 tag 714a into a data track of the first frame 708 representing 0% played of the advertisement 704. The adaptive bit rate viewer 324 is configured to instruct the encoder 316 to insert a unique ID3 tag 714e into a data track of the last frame 712 representing 100% played of the advertisement 704. By determining the frame rate of the transport signal stream 702 based on metadata extracted by the CIS 310 from the encoder 316, and calculating a length of advertisement 704 of the transport signal stream 702 based on the first frame 708 and the last frame 712 identified by the POIS 318, the adaptive bit rate viewer 324 is configured to determine frames 716a, 716b, 716c of the transport signal stream 702 corresponding to the 25%, 50%, and 75% percentile of an advertisement 704 to be played. In one embodiment, the adaptive bit rate viewer 324 may be configured to instruct the encoder 316 to insert one each of unique ID3 tags 714b, 714c, 714d corresponding to the 25%, 50%, and 75% percentiles of ad played in corresponding data tracks of the frames 716a, 716cb, 716c of the of the transport signal stream 702. In one embodiment, the adaptive bit rate viewer 324 may be configured to instruct the encoder 316 to inserts the ID3 tags 714a-712e in only the first frame of a percentile (e.g., 50% or 716b), the last frame of a percentile, throughout a percentile, or a combination of any of the above. A person skilled in the art will realize that the method 700 may apply to a plurality of individual advertisements inserted within the advertisement break 705 of the transport signal stream 702.

While there may be a total of, for example, fifteen (15) unique identifiers or UUIDs, five for each transport stream resolution rate, the adaptive bit rate viewer 324 may be configured to group corresponding unique identifiers associated with a specific percentile but of different frame rates for each transport stream together to identify a single percentile played (e.g., UUID1, UUID2, UUID3 for 0% played percentile, UUID4, UUID5, UUID6 for the 25% percentile played, etc.).

In an embodiment, the adaptive bit rate viewer 324 may be further configured to report a percentage of an advertisement played by a smart appliance (e.g., 308a). The adaptive bit rate viewer 324 may be configured to receive data from a smart appliance (e.g., 308a). The adaptive bit rate viewer 324 may be configured to detect a marker in the data corresponding to a segment of an advertisement break of a session played by the smart appliance (e.g., 308a). The adaptive bit rate viewer 324 may be configured to map the marker to a percentage played of the advertisement in the session by the smart appliance (e.g., 308a). The adaptive bit rate viewer 324 may be configured to reporting the percentage played of the advertisement in the session by the smart appliance (e.g., 308a) to at least one tracking element (e.g., 328a). In an example, the adaptive bit rate viewer 324 may be further configured to alter the session manifest 402 to instruct an ADS (e.g., 304a) or a CDN 306 to transmit code in the form of a document to a smart appliance (e.g., 308a) to permit the smart appliance (e.g., 308a) to detect a marker indicative of a play time interval, and, in response, to permit the smart appliance (e.g., 308a) to provide an indication to the adaptive bit rate viewer 324 of a proportion of an advertisement played by the smart appliance (e.g., 308a). In another example, the MSO may distribute the code document to manufacturers of the smart appliances 308a-308n to permit a manufacturer to incorporate the code into the overall executable code of the smart appliances 308a-308n.

In an example, the information provided in the indication to be transmitted from the smart appliance (e.g., 308a) to the adaptive bit rate viewer 324 may take the form of a string, e.g., "#URL://router/UUID/device identifier or MAC address/ time code" where "router" is an IPV4 or IPV6 address of the router 302, UUID may be the UUID of the ID3 tag inserted by the adaptive bit rate viewer 324 and received by the smart appliance (e.g., 308a), "device identifier or MAC identifier" is an identity associated with a particular smart appliance (e.g., 308a), such as a serial number of the smart appliance (e.g., 308a) or the MAC address (i.e., the media access control address) of the smart appliance (e.g., 308a) that effectively identifies a session of a channel played by the smart appliance (e.g., 308a), and "time code" refers to a wall clock time or time stamp that may be, for example, synchronized broadcast time (e.g., wall clock time delayed by seven seconds).

In an example, the adaptive bit rate viewer 324 may be further configured to respond to the data received from the smart appliance (e.g., 308a) by mapping the fields of the data to corresponding elements stored in a database 326 to data to be reported to one or more tracking elements 328a-328n. The database 326 may comprise tables that include UUIDs, the corresponding quartile, the device address or MAC address, and the time code. The adaptive bit rate viewer 324 may be configured to map the incoming data to a corresponding ID3 tag. From each unique ID3 tag, the adaptive bit rate viewer 324 may further identify a resolution rate of the transport signal stream played as well as whether there were any changes in resolution rate during playing of an advertisement or content. The mapped information for reporting to a tracking element (e.g., 328*a*) may be the name of a tracking element associated with the received session, the session, the quartile played, the adaptive bit rate or resolution of the transport signal stream, and an associated time code.

In an example, while there may be a total of, for example, fifteen (15) unique identifiers or UUIDs, five for each transport stream resolution rate, the adaptive bit rate viewer 324 may be configured to group corresponding received unique identifiers associated with a specific percentile but of different frame rates for each transport stream together to identify a single percentile played (e.g., UUID1, UUID2, UUID3 for 0% played percentile, UUID4, UUID5, UUID6 for the 25% percentile played, etc.).

A tracking element (e.g., 328*a*) may be associated with a local or national programmer or network (e.g., 328*a*, 328*b*), an MSO (e.g., 328*c*), a local or national advertiser (e.g., 328*d*, 328*e*), a third party verification system (328*n*), or one or more of the ADSs (e.g., 304*a*-304*n*). In an example, the adaptive bit rate viewer 324 may keep track of the data (e.g., the percentage played of each session) in the database 326 for later retrieval in order to permit an owner of the server 302 to charge an organization associated with a tracking element (e.g., 328*a*) a fee based on the percentage of a session played.

Figure 8:
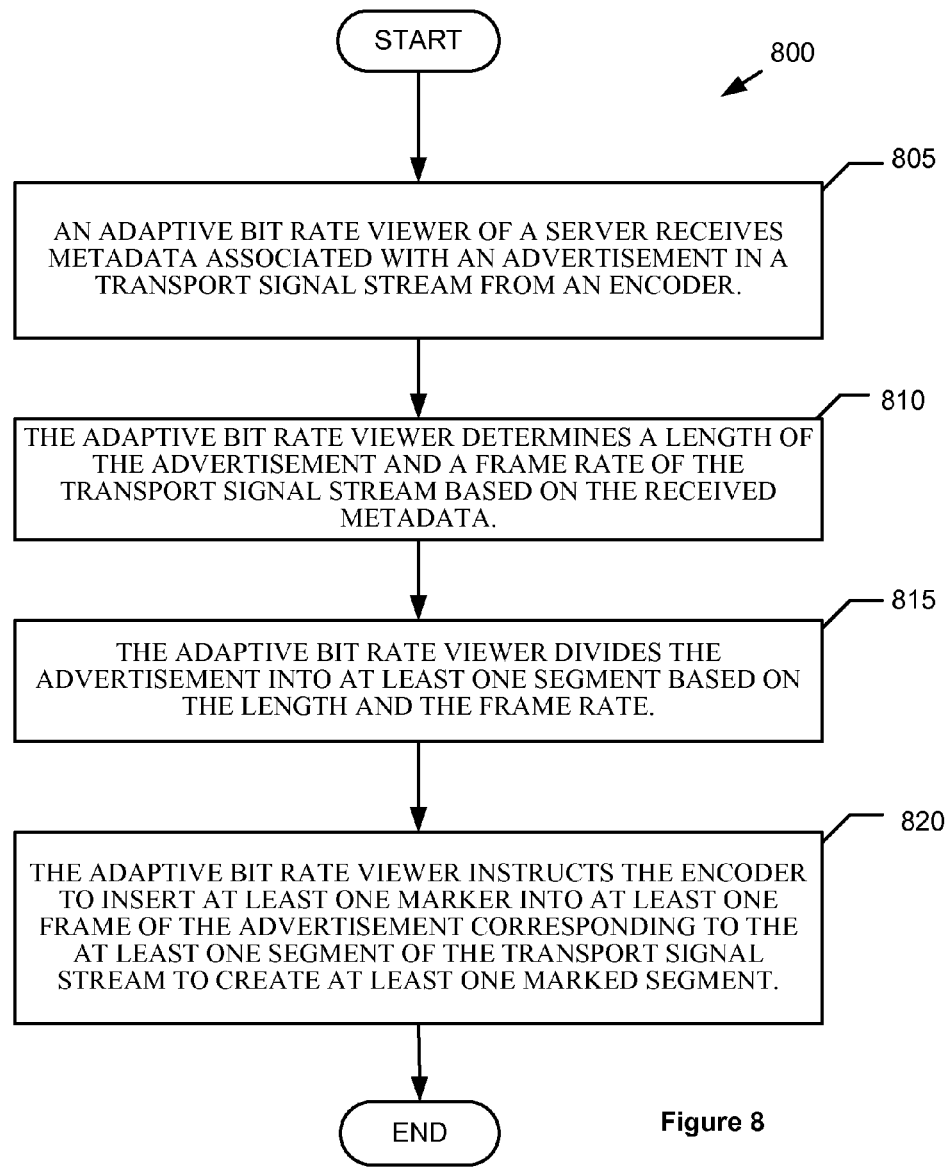
FIG. 8 is a flow diagram illustrating an example of a method for enabling reporting of a percentage of an advertisement playable by a smart appliance.

FIG. 8 is a flow diagram illustrating an example of a method 800 for enabling reporting of a percentage of an advertisement playable by a smart appliance. The method 800 may be performed by a computer system 300 of FIG. 3 and may comprise hardware (e.g., circuitry, dedicated logic, programmable logic, microcode, etc.), software (e.g., instructions run on a processing device), or a combination thereof. In one example, the method 800 is performed by the adaptive bit rate viewer 324 of the server 302 of FIG. 3.

As shown in FIG. 8, at block 805, the adaptive bit rate viewer 324 of the server 302 receives metadata associated with an advertisement in a transport signal stream from an encoder 316. At block 810, the adaptive bit rate viewer 324 determines a length of the advertisement and a frame rate of the transport signal stream based on the received metadata. In another example, the length of the advertisement and a frame rate of the transport signal stream may be determined based on an analysis of the in-band transport signal stream itself rather than from out-of-band metadata associated with the transport signal stream.

At block 815, the adaptive bit rate viewer 324 divides the advertisement into at least one segment based on the length and the frame rate. At block 820, the adaptive bit rate viewer 324 instructs the encoder 316 to insert at least one marker into at least one frame of the advertisement corresponding to the at least one segment of the transport signal stream to create at least one marked segment.

In an example, the at least one marked segment may be indicative of a percentage of the advertisement inserted into the advertisement break playable by a smart appliance (e.g., 308*a*). The length of the advertisement may be representative of a difference in time between a last frame of the advertisement and a first frame of the advertisement. A length of the at least one segment may be based on the frame rate. The number of segments may be based on quartiles of percentage of an advertisement playable by the smart appliance (e.g., 308*a*).

In an embodiment, the adaptive bit rate viewer 324 may instruct the encoder 316 to insert the at least one marker (e.g., UUID1) on a per frame, per segment, per sub-segment, or per plurality of segments basis. The adaptive bit rate viewer 324 may instruct the encoder 316 to insert a different value for the at least one marker into each segment of the at least one segment. A specific segment may be proportional to a percentage of the advertisement playable by the smart appliance (e.g., 308*a*). In an embodiment, when the frame rate changes during transmission of the advertisement, the adaptive bit rate viewer 324 may instruct the encoder 316 to insert at least one different marker into at least one frame of the advertisement corresponding to the at least one segment. The adaptive bit rate viewer 324 may instruct the encoder 316 to insert the at least one marker into at least one of a first frame of a percentile, a last frame of a percentile, multiple but not all frame of a percentile, or throughout a percentile.

In one embodiment, the adaptive bit rate viewer 324 may group a plurality of markers associated with a specific percentile but of different frame rates for each transport stream together for identifying a single percentile played.

In one example, the marker may be an ID3 tag (e.g., 408*a*). In an example, the ID3 tag (e.g., 408*a*) may comprise a unique identifier (e.g., UUID1) indicative of a percentage of an advertisement inserted into the advertisement break playable by the smart appliance (e.g., 308*a*). In an example, the unique identifier (e.g., UUID1) may be a universal unique identifier (UUID). The adaptive bit rate viewer 324 may instruct the encoder 324 to insert the ID3 tag into a data track or fundamental track of the transport signal stream.

In an embodiment, the at least one ID3 tag (e.g., UUID5) assigned to a last segment may be operable to disable fast forwarding in the smart appliance (e.g., 308*a*). The at least one ID3 tag (e.g., UUID1) assigned to a first segment may be operable to enable fast forwarding in the smart appliance (e.g., 308*a*).

In another example, the marker may be encoded into XML metadata in a sparse track of the transport signal stream.

Figure 9:
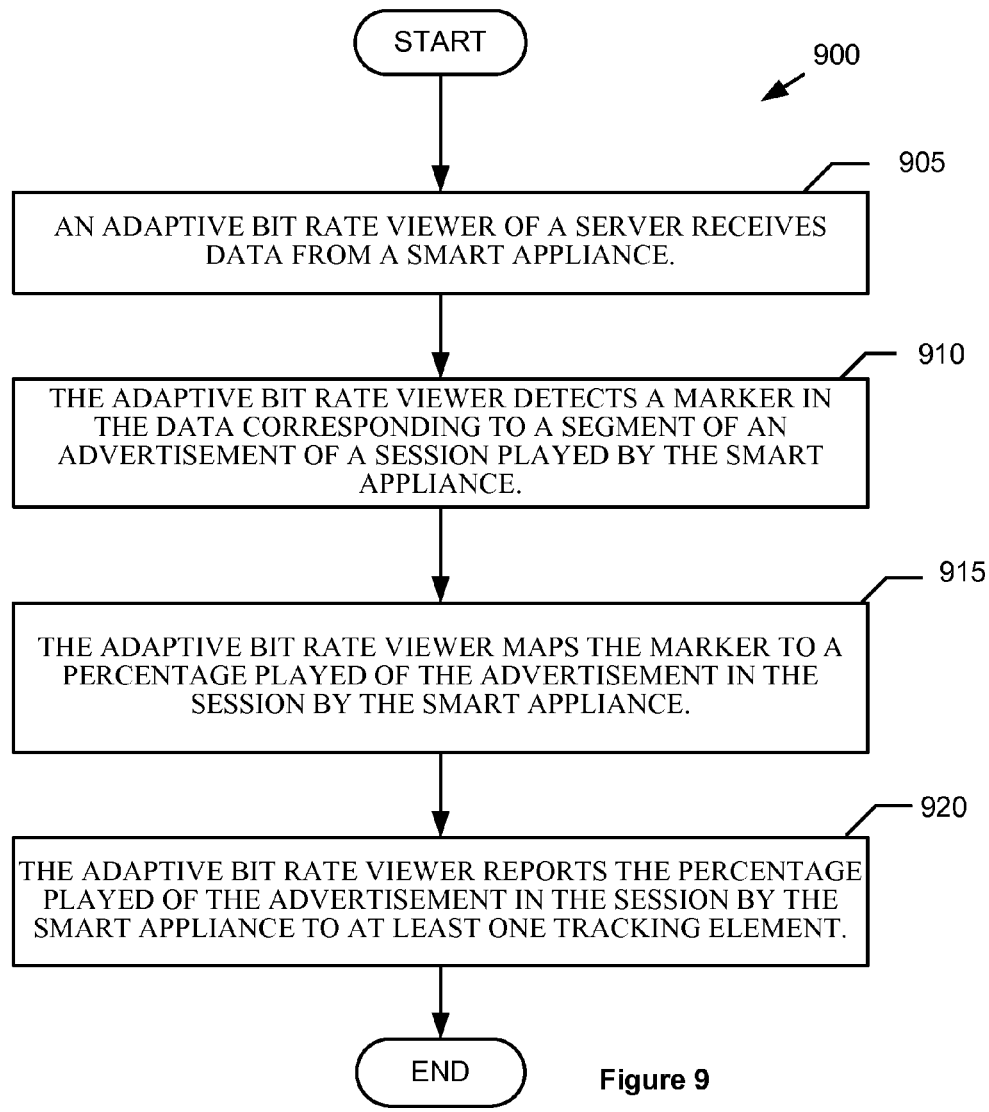
FIG. 9 is a flow diagram illustrating an example of a method for reporting a percentage of an advertisement that has been played by a smart appliance.

FIG. 9 is a flow diagram illustrating an example of a method 900 for reporting a percentage of an advertisement that has been played by a smart appliance. The method 800 may be performed by a computer system 300 of FIG. 3 and may comprise hardware (e.g., circuitry, dedicated logic, programmable logic, microcode, etc.), software (e.g., instructions run on a processing device), or a combination thereof. In one example, the method 800 is performed by the adaptive bit rate viewer 324 of the server 302 of FIG. 3.

As shown in FIG. 9, at block 905, the adaptive bit rate viewer 324 of the server 302 receives data from a smart appliance (e.g., 308*a*). In one embodiment, the received data may be in the form of a universal resource locator (URL). The URL may comprise at least one of a universal unique identifier indicative of the percentage of the advertisement played, a device identifier or MAC identifier indicative of a specific session, and a time stamp corresponding to a synchronized broadcast time.

At block 910, the adaptive bit rate viewer 324 detects a marker in the data corresponding to a segment of an advertisement of a session played by the smart appliance (e.g., 308*a*).

In an embodiment, the detected marker may differ on a per frame, per segment, per sub-segment, or per plurality of segments basis. The detected marker may differ on a per percentile basis of the advertisement played by the smart appliance (e.g., 308*a*).

The detected marker may differ on a per frame rate or session resolution of the advertisement played by the smart appliance (e.g., 308*a*). The marker may be detected for one of a first frame of a percentile, a last frame of a percentile, multiple but not all frame of a percentile, or throughout a percentile. The detected marker may be indicative of a frame rate or resolution of a segment of the session.

In an embodiment, the marker may comprise an ID3 tag. The ID3 tag may comprise a unique identifier indicative of the percentage of an advertisement playable by a smart appliance (e.g., 308a). The unique identifier may be a universal unique identifier (UUID) (which, in an example, may be the UUID passed from the adaptive bit rate viewer 324 to identify the segment played).

At block 915, the adaptive bit rate viewer 324 maps the marker to a percentage played of the advertisement in the session by the smart appliance (e.g., 308a). In one example, the adaptive bit rate viewer 324 maps fields of the marker in the database 326 into a format for reporting to the one or more of the tracking elements 328a-328n. The database 326 may comprise tables that include UUIDs, the corresponding quartile, and the URL. The adaptive bit rate viewer 324 may map the detected marker to a corresponding ID3 tag. The mapped information for reporting to a tracking element (e.g., 328a) may be the name of a tracking element associated with the received session, the session, the quartile played, and an associated time code (a time stamp corresponding to a synchronized broadcast time (e.g., wall clock time delayed by seven seconds).

When the detected marker is indicative of a frame rate or resolution of a segment of the session, the adaptive bit rate viewer 324 may map the detected marker to a same percentage played but of a different frame rate or session resolution. The adaptive bit rate viewer 324 may group a plurality of markers associated with a specific percentile but of different frame rates corresponding to the session together for identifying a single percentile played.

At block 920, the adaptive bit rate viewer 324 reports the percentage played of the advertisement in the session by the smart appliance to at least one tracking element (e.g., 328a). The tracking element (e.g., 328a) may be associated with a local or national programmer or network, an MSO, a local or national advertiser, a third party verification system, or one or more advertisement decision services 304a-304n.

In an example, the adaptive bit rate viewer 324 may keep track of the data (e.g., the percentage played of each session) in the database 326 for later retrieval in order to permit an owner of the server 302 to charge an organization associated with the tracking element (e.g., 328a) a fee based on the percentage of a session played. In an embodiment, the adaptive bit rate viewer 324 may directly keep track of tracking fees to be charged to an organization associated with the tracking element based on the percentage of an advertisement played.

In one embodiment, the adaptive bit rate viewer 324 may transmit code to the smart appliance to detect the marker and to provide the indication to the server 302 in response to the smart appliance (e.g., 308a) detecting the marker. To accomplish this, the adaptive bit rate viewer 324 may instruct an advertisement decision service (e.g., 304a) to insert the code into at least a first segment of a session.

In another example, the MSO may distribute the code document to the manufacturers of the smart appliances 328a-328n to permit a manufacturer to incorporate the code into the overall executable code of the smart appliances 328a-328n. Code for enabling or disabling fast forwarding may be included in the code document.

Figure 10:
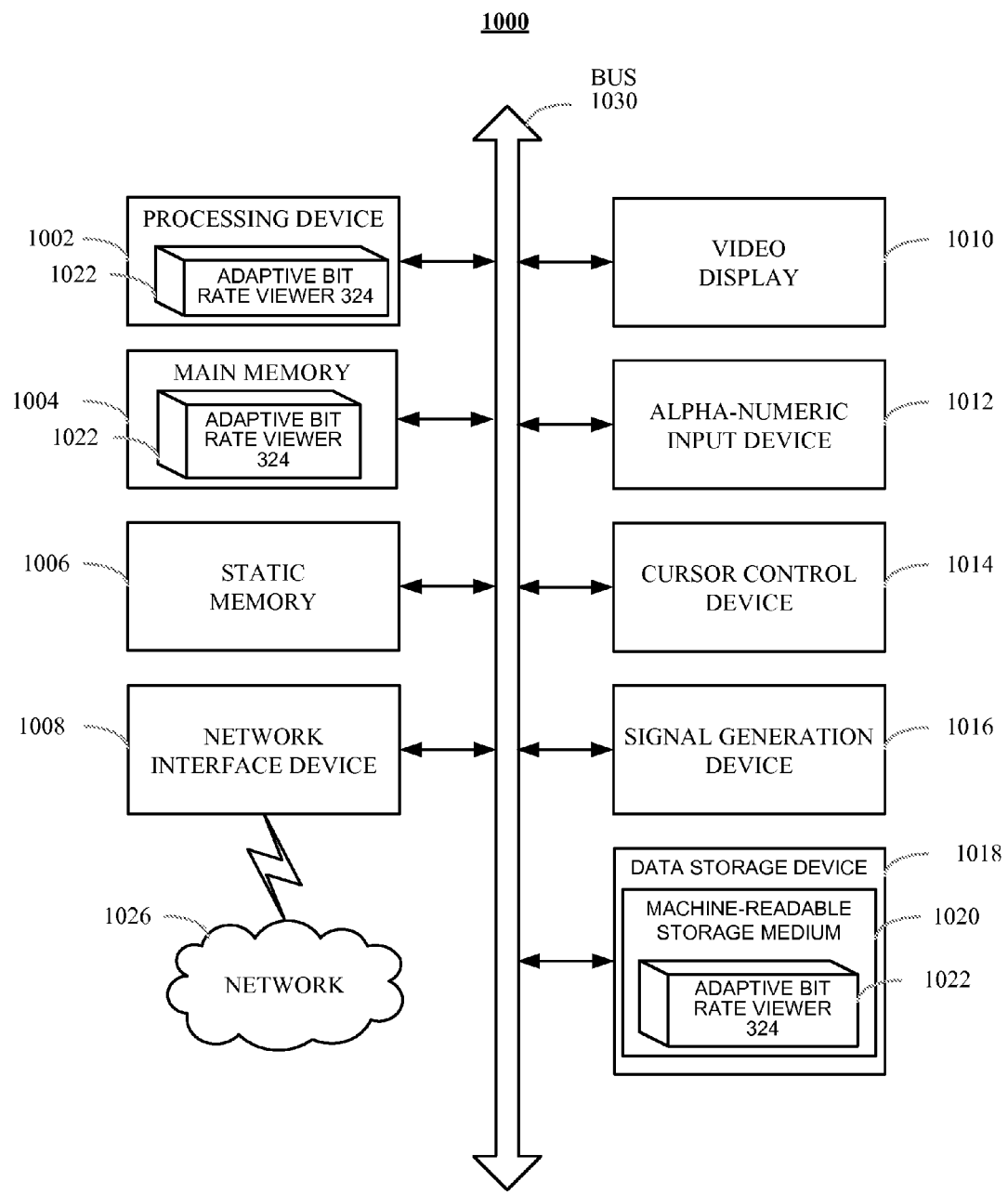
FIG. 10 illustrates a diagrammatic representation of a machine in the exemplary form of a computer system within which a set of instructions, for causing the machine to perform any one or more of the methodologies discussed herein, may be executed.

FIG. 10 illustrates a diagrammatic representation of a machine in the example form of a computer system 1000 within which a set of instructions, for causing the machine to perform any one or more of the methodologies discussed herein, may be executed. In some examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processing device (processor) 1002, a main memory 1004 (e.g., read-only memory (ROM), flash memory, dynamic random access memory (DRAM) such as synchronous DRAM (SDRAM)), a static memory 1006 (e.g., flash memory, static random access memory (SRAM)), and a data storage device 1016, which communicate with each other via a bus 1008.

Processor 1002 represents one or more general-purpose processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1002 may also be one or more special-purpose processing devices such as an application specific integrated circuit (ASIC), a field programmable gate array (FPGA), a digital signal processor (DSP), network processor, or the like. The adaptive bit rate viewer 324 shown in FIG. 3 may be executed by processor 1002 configured to perform the operations and steps discussed herein.

The computer system 1000 may further include a network interface device 1022. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker).

A drive unit 1016 may include a computer-readable medium 1024 on which is stored one or more sets of instructions (e.g., instructions of the adaptive bit rate viewer 324) embodying any one or more of the methodologies or functions described herein. The instructions of the adaptive bit rate viewer 324 may also reside, completely or at least partially, within the main memory 1004 and/or within the processor 1002 during execution thereof by the computer system 1000, the main memory 1004 and the processor 1002 also constituting computer-readable media. The instructions of the adaptive bit rate viewer 324 may further be transmitted or received over a network via the network interface device 1022.

While the computer-readable storage medium 1024 is shown in an example to be a single medium, the term "computer-readable storage medium" should be taken to include a single non-transitory medium or multiple non-transitory media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It is apparent, however, to one of ordinary skill in the art having the benefit of this disclosure, that examples of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "writing", "maintaining", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Examples of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. Example structure for a variety of these systems appears from the description herein. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
   receiving, by a server, metadata associated with an advertisement signal stream from an encoder;
   determining, by the server, a length of the advertisement and a frame rate of in the transport signal stream based on the received metadata;
   dividing, by the server, the length of the advertisement into a plurality of time intervals; and
   instructing the encoder, by the server, to insert a first set of markers into a first set of segments of the transport signal stream corresponding to a plurality of time intervals of the advertisement to create a first plurality of marked segments, each marker of the first set of markers indicative of a total percentage of the advertisement playable by a smart appliance,
   wherein, when the metadata received from the encoder by the server indicates a change in frame rate of the advertisement in the transport signal stream,
   instructing the encoder, by the server, to insert a second set of markers into a remaining set of segments of the transport signal stream beginning at a location in the transport signal stream corresponding to the change in frame rate of the advertisement, at least one marker of the remaining set of markers differing from a corresponding at least one marker of the first set of markers but representing the same total percentage of the advertisement playable by the smart appliance; and
   grouping, by the server, the at least one marker of the remaining set of markers with the corresponding at least one marker of the first set of markers associated with a specific percentile but of different frame rates together for identifying the same total percentage of the advertisement playable by the smart appliance.

2. The method of claim 1, wherein the length of the advertisement is representative of a difference in time between a last frame of the advertisement and a first frame of the advertisement.

3. The method of claim 1, wherein a length of a segment is based on the frame rate.

4. The method of claim 1, further comprising instructing the encoder to insert a marker of the first set of markers into the transport signal stream on a per frame, per segment, per sub-segment, or per plurality of segments basis.

5. The method of claim 1, further comprising instructing the encoder to insert different values for each marker of the first set of markers into corresponding segments in the transport signal stream.

6. The method of claim 1, further comprising instructing the encoder to insert a marker of the first set of markers into at least one of a first frame of a percentile, a last frame of a percentile, multiple but not all frame of a percentile, or throughout a percentile.

7. The method of claim 1, wherein a specific segment is proportional to a percentage of the advertisement playable by the smart appliance.

8. The method of claim 1, wherein the number of segments is based on quartiles of percentage of an advertisement playable by the smart appliance.

9. The method of claim 1, wherein the at least one marker assigned to a last segment is operable to disable fast forwarding in the smart appliance.

10. The method of claim 5, wherein the at least one marker assigned to a first segment is operable to enable fast forwarding in the smart appliance.

11. The method of claim 1, wherein the at least one marker comprises an ID3 tag.

12. The method of claim 11, wherein the ID3 tag comprises a unique identifier indicative of the percentage of an advertisement playable by a smart appliance.

13. The method of claim 12, wherein the unique identifier is a universal unique identifier (UUID).

14. The method of claim 12, wherein the ID3 tag is inserted into a data track or a fundamental track of the transport signal stream.

15. A computer system for reporting a percentage of an advertisement playable by a smart appliance, comprising:
 a memory;
 a server, coupled to the memory, the server to:
  receive metadata associated with an advertisement in a transport signal stream from an encoder;
  determine a length of the advertisement and a frame rate of in the transport signal stream based on the received metadata;
  divide the length of the advertisement into a plurality of time intervals; and
  instruct the encoder to insert a first set of markers into a first set of segments of the transport signal stream corresponding to a plurality of time intervals of the advertisement to create a first plurality of marked segments, each marker of the first set of markers indicative of a total percentage of the advertisement playable by a smart appliance,
  wherein, when the metadata received from the encoder by the server indicates a change in frame rate of the advertisement in the transport signal stream,
  instruct the encoder to insert a second set of markers into a remaining set of segments of the transport signal stream beginning at a location in the transport signal stream corresponding to the change in frame rate of the advertisement, at least one marker of the remaining set of markers differing from a corresponding at least one marker of the first set of markers but representing the same total percentage of the advertisement playable by the smart appliance; and
  group the at least one marker of the remaining set of markers with the corresponding at least one marker of the first set of markers associated with a specific percentile but of different frame rates together for identifying the same total percentage of the advertisement playable by the smart appliance.

16. A non-transitory computer readable storage medium including instructions that, when executed by a server, causes the server to perform operations, comprising:
 receiving, by a server, metadata associated with an advertisement in a transport signal stream from an encoder;
 determining, by the server, a length of the advertisement and a frame rate of in the transport signal stream based on the received metadata;
 dividing, by the server, the length of the advertisement into a plurality of time intervals; and
 instructing the encoder, by the server, to insert a first set of markers into a first set of segments of the transport signal stream corresponding to a plurality of time intervals of the advertisement to create a first plurality of marked segments, each marker of the first set of markers indicative of a total percentage of the advertisement playable by a smart appliance,
 wherein, when the metadata received from the encoder by the server indicates a change in frame rate of the advertisement in the transport signal stream,
 instructing the encoder, by the server, to insert a second set of markers into a remaining set of segments of the transport signal stream beginning at a location in the transport signal stream corresponding to the change in frame rate of the advertisement, at least one marker of the remaining set of markers differing from a corresponding at least one marker of the first set of markers but representing the same total percentage of the advertisement playable by the smart appliance; and
 grouping, by the server, the at least one marker of the remaining set of markers with the corresponding at least one marker of the first set of markers associated with a specific percentile but of different frame rates together for identifying the same total percentage of the advertisement playable by the smart appliance.

\* \* \* \* \*